United States Patent [19]
Selker et al.

[11] Patent Number: 5,694,123
[45] Date of Patent: Dec. 2, 1997

[54] KEYBOARD WITH INTEGRATED POINTING DEVICE AND CLICK BUTTONS WITH LOCK DOWN FOR DRAG OPERATION IN A COMPUTER SYSTEM WITH A GRAPHICAL USER INTERFACE

[75] Inventors: Edwin Joseph Selker, Palo Alto, Calif.; Michio Suzuki, Yokohama, Japan; Tomoyuki Takahaski, Fujisawa, Japan; Yoshiharu Uchiyama, Isehara, Japan

[73] Assignee: International Business Machines Corporation, Armonk, N.Y.

[21] Appl. No.: 306,360

[22] Filed: Sep. 15, 1994

[51] Int. Cl.$^6$ ................................................. H03K 17/94
[52] U.S. Cl. ........................ 341/22; 341/20; 341/34; 345/161; 345/168
[58] Field of Search ................... 341/20, 21, 22, 341/23, 34; 345/157, 160, 161, 163, 167, 168, 173, 184

[56] References Cited

U.S. PATENT DOCUMENTS

| | | | |
|---|---|---|---|
| 5,148,155 | 9/1992 | Martin et al. | 340/712 |
| 5,268,674 | 12/1993 | Howard et al. | 345/163 |
| 5,269,004 | 12/1993 | Comerford et al. | 341/22 |
| 5,305,238 | 4/1994 | Starr, III et al. | 364/569 |
| 5,428,355 | 6/1995 | Jondrow et al. | 341/20 |
| 5,448,240 | 9/1995 | Morito | 341/20 |
| 5,489,900 | 2/1996 | Cali et al. | 341/22 |
| 5,521,596 | 5/1996 | Selker et al. | 341/20 |

FOREIGN PATENT DOCUMENTS

| | | |
|---|---|---|
| 0490001 | 6/1992 | European Pat. Off. |
| WO 92/09996 | 6/1992 | WIPO. |

OTHER PUBLICATIONS

IBM Technical Disclosure Bulletin entitled "Enlarged Cursor Key with Trackball" dated Feb. 1991, vol. 33, No. 9, pp. 428–430.

Japanese Abstracts, Sect. P, Section No. 532; vol. 11, No. 2, p. 94, Jan. 6, 1997 (JP 61–180325).

Japanese Abstracts, Sect. P, Section No. 1223; vol. 15, No. 301, p. 31, Jul. 31, 1991 (JP 03–105417).

Japanese Abstracts, Sect. P, Section No. 1326; vol. 16, No. 109, p. 145, Mar. 17, 1992 (JP–03–282815).

Primary Examiner—Jeffery Hofsass
Assistant Examiner—Andrew Hill
Attorney, Agent, or Firm—Baker, Maxham, Jester & Meador

[57] ABSTRACT

An integrated manual control input device is provided for use in a computer system having a graphical user interface. The device comprises a keyboard unit having a plurality of keys, a pointing actuator mounted to the keyboard between preselected ones of the keys for engagement by a user's index finger, at least one click button assembly pivotably mounted to the keyboard unit adjacent the keys and a normally open momentary switch beneath the click button assembly. The click button assembly has a button moveable downwardly by a user's thumb to select an ON state and subsequently releasable to select an OFF state. The button is also moveable downwardly and slidable laterally in a rearward direction to select a locked ON state to facilitate a drag operation.

20 Claims, 6 Drawing Sheets

KEYBOARD WITH INTEGRATED POINTING DEVICE AND CLICK BUTTONS WITH LOCK DOWN FOR DRAG OPERATION IN A COMPUTER SYSTEM WITH A GRAPHICAL USER INTERFACE

BACKGROUND OF THE INVENTION

1. Field of the Invention

This invention relates generally to computer systems with graphical user interfaces and, more particularly, to control of computer activities with graphical user interface pointing devices.

2. Description of the Related Art

The interactive computer system operating environment, such as encountered by users of personal computers and the like, is characterized by efforts toward increasing ease of operation and convenience. An important contribution to making the operation of such computers easier and more convenient is the graphical user interface (GUI). A GUI provides a computer interface that is visually oriented and includes a variety of graphical artifacts displayed on a computer display that make the operation of the computer more intuitive and thereby can increase user efficiency.

A GUI operating system enables a user to move a computer display pointer by using a GUI pointing device such as a display mouse or track ball that is attached to the computer. Generating a control input by moving the mouse across a desktop or rolling the track ball in its cradle moves the pointer across the display in the same direction of movement, according to a response function of the pointing device. The relationship between pointing device control input and pointer response on the display screen is intuitive to the user. Many GUI systems permit multiple programs to be represented simultaneously on the computer display as different display windows. The boundaries of the windows can be adjusted or can be reduced to an icon representation. To activate a program, or to re-enter it, a user targets the display pointer within the desired program window or targets the display icon representing the program and presses a button of the display mouse or track ball device. Pressing the button, also referred to as "clicking" it, activates or re-enters the program. To activate a program without the GUI, a user would need to type the name of an executable file and provide it to the operating system. In this way, the keystrokes needed to activate or re-enter a program are eliminated or at least substantially reduced, making the computer easier and more convenient to use. The ability to point to a desired activity makes learning the operation of the computer easier and more convenient.

Additional improvements to program interaction through graphical user interface display pointer control are rapidly being achieved. For example, IBM Corporation has introduced a display pointer control feature called "TrackPoint II" (Trademark) that includes a small, substantially rigid joystick-type actuator imbedded in the center of an otherwise conventional "QWERTY" computer keyboard. The TrackPoint II control actuator is located between the G, H and B keys, between the hands of a typist at the home position, and is sufficiently short so that it does not interfere with normal typing on the keyboard. A computer user can apply lateral forces to the control actuator with his or her index finger to move the pointer around on the computer display, rather than using a display mouse. The keyboard provided with the TrackPoint II feature includes a pair of click buttons below the middle of the space bar that duplicate the function of the display mouse buttons. These buttons are easily depressed with a thumb. In this way, the user's hands do not need to leave the keyboard to control the display pointer. The index finger and thumb of the same hand can simultaneously control the joystick-type actuator and either of the click buttons. A keyboard with such an integrated pointing device is especially desirable in a portable computer, known as a laptop or notebook computer, having a graphical user interface, where it can be inconvenient or difficult to connect and/or use a mouse or track ball with the computer to control display pointer movement. The IBM Corporation notebook computer called "ThinkPad 750" includes a TrackPoint II control actuator of the foregoing type.

The TrackPoint II control actuator and associated click buttons significantly reduce the time required for a user to select windows, icons, text commands and other displayed features of a GUI over the conventional approach of manipulating a mouse or track ball physically separated from the keyboard. In addition, the TrackPoint II control actuator and associated click buttons are particularly well suited for portable computers which are often used in airplanes, automobiles and other locations that do not have sufficient space for operation of a separate mouse or track ball.

The TrackPoint II control actuator and associated click buttons which have heretofore been incorporated into commercially available computers sold by IBM Corporation are easy to operate insofar as performing a single click operation. However, it is more difficult when a drag operation (click and hold) is performed. In this operation, the user positions the cursor or pointer over an object of interest on the computer display by applying forces with his or her index finger to the joystick-type actuator between the G, H and B keys. The user then depresses one of the click buttons, usually the left button, and continues to manipulate the joystick-type actuator with his or her index finger while holding the click button down until the object of interest is moved to the correct position on the display. In a text-based application such as word processing, this drag operation may move all of the text from a first cursor position to a second cursor position. In a drafting application, dragging may have the effect of moving an object such as a door from one location to another. In a computer system with a GUI, dragging an icon representing a file from an initial position to a new position may have the effect of moving a disk file from one subdirectory or disk to another.

Dragging can be tedious with the aforementioned TrackPoint II control actuator and conventional click buttons where the click button must be held down for a relatively long period of time. If the user accidently lifts up or releases the depressed click button during the drag operation, the intended command may be aborted, or worse yet, an error may result, such as a file being stored in the wrong location.

SUMMARY OF THE INVENTION

It is the primary object of the present invention to provide an improved keyboard with an integrated pointing device and at least one click button that will facilitate a drag operation when the keyboard is used in conjunction with a computer system having a graphical user interface.

According to the present invention an integrated manual control input device is provided for use in a computer system having a graphical user interface. The device comprises a keyboard unit having a plurality of keys, a pointing actuator mounted to the keyboard between preselected ones of the keys for engagement by a user's index finger, at least one click button assembly pivotably mounted to the keyboard unit adjacent the keys and a normally open momentary switch beneath the click button assembly. The click button assembly has a button moveable downwardly by a user's thumb to select an ON state and subsequently releasable to select an OFF state. The button is also moveable downwardly and slidable laterally to select a locked ON state to facilitate a drag operation.

BRIEF DESCRIPTION OF THE DRAWINGS

Throughout the drawing figures like reference numerals refer to like parts. The drawings are not to scale.

DESCRIPTION OF THE PREFERRED EMBODIMENT

Figure 1:
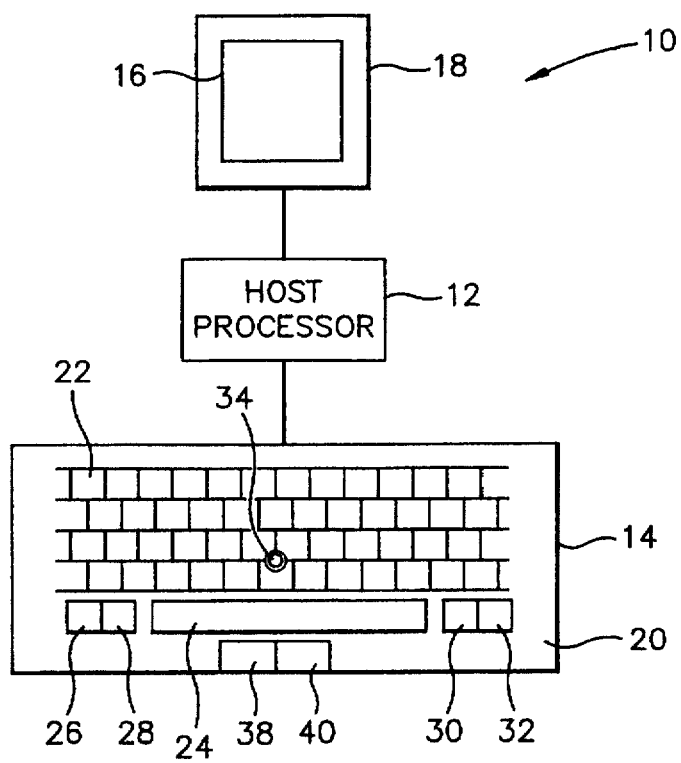
FIG. 1 is a schematic representation of a computer system having a keyboard with an integrated pointing device and click buttons with lock down for facilitating a drag operation in a graphical user interface in accordance with the present invention.

Referring to FIG. 1, a computer system 10 is illustrated which comprises a host processor 12 that receives manual control inputs from an attached keyboard unit 14 and displays system responses on a display screen 16 of a display device 18. The keyboard unit 14 includes a surrounding rectangular frame 20 that supports a plurality of manually depressible keys 22. The keys 22 include the normal twenty-six keys bearing the letters of the alphabet which are arranged in the conventional QWERTY layout. The keys 22 also include conventional F1 through F12 function keys, and other keys such as CAPS LOCK, SHIFT, TAB, BACKSPACE, ENTER and so forth. The keyboard unit 14 further includes a SPACE BAR key 24 a CTRL key 26, and ALT key 28, another ALT key 30 and another control CTRL key 32.

Figure 2:
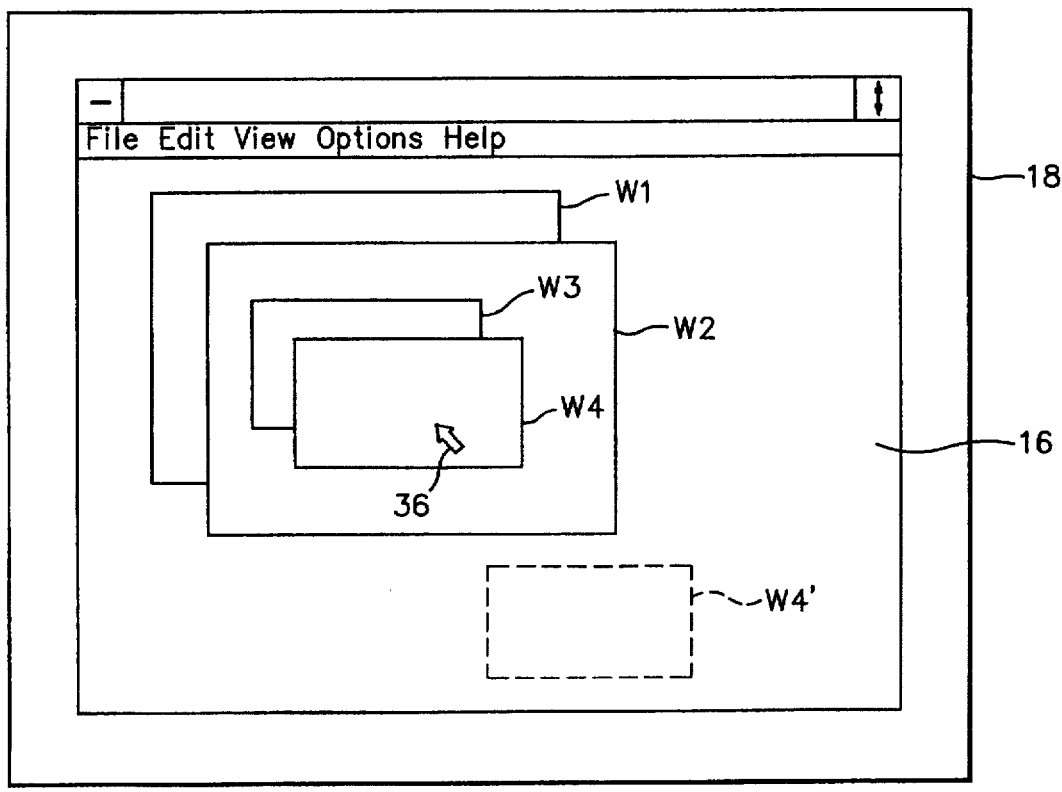
FIG. 2 illustrates a pointer of a graphical user interface which is used to select one of several displayed objects.

The keyboard unit 14 (FIG. 1) has a small, substantially rigid joystick actuator 34 embedded therein between the G, H and B keys. The joystick actuator 34 can be engaged by the tip of the user's index finger and lateral forces applied over a 360° range in the general horizontal plane of the keyboard unit 14 in order to move an active pointer 36 (FIG. 2) across the entire display screen 16. By way of example, this enables the user to select one of the windows W1, W2, W3 and W4 displayed by the GUI. It will be understood that the pointer 36 can also be used to select icons, windows and other commands displayed by the GUI and to designate system tasks, change the display, and so forth.

The joystick actuator 34 preferably comprises a small vertical post with an elastomeric cap on its upper end (not illustrated). The lower end of the post is rigidly secured to a force transducer (not illustrated) preferably in the form of a thin film resistive strain gauge in the manner set forth in my co-pending U.S. patent application Ser. No. 08/181,648 entitled FORCE TRANSDUCER WITH PRINTED STRAIN GAUGES filed Jan. 14, 1994, the entire disclosure of which is specifically incorporated herein by reference. The aforementioned application is assigned to IBM Corporation, as is the subject application.

Referring to FIG. 1, the keyboard unit 14 further includes a pair of click button assemblies 38 and 40 mounted in side-by-side relationship rearward of the space bar 24 in the wrist support of the frame 20. The click button assemblies 38 and 40 serve the same function as the click buttons on the conventional mouse widely used with personal computers.

Figure 3:
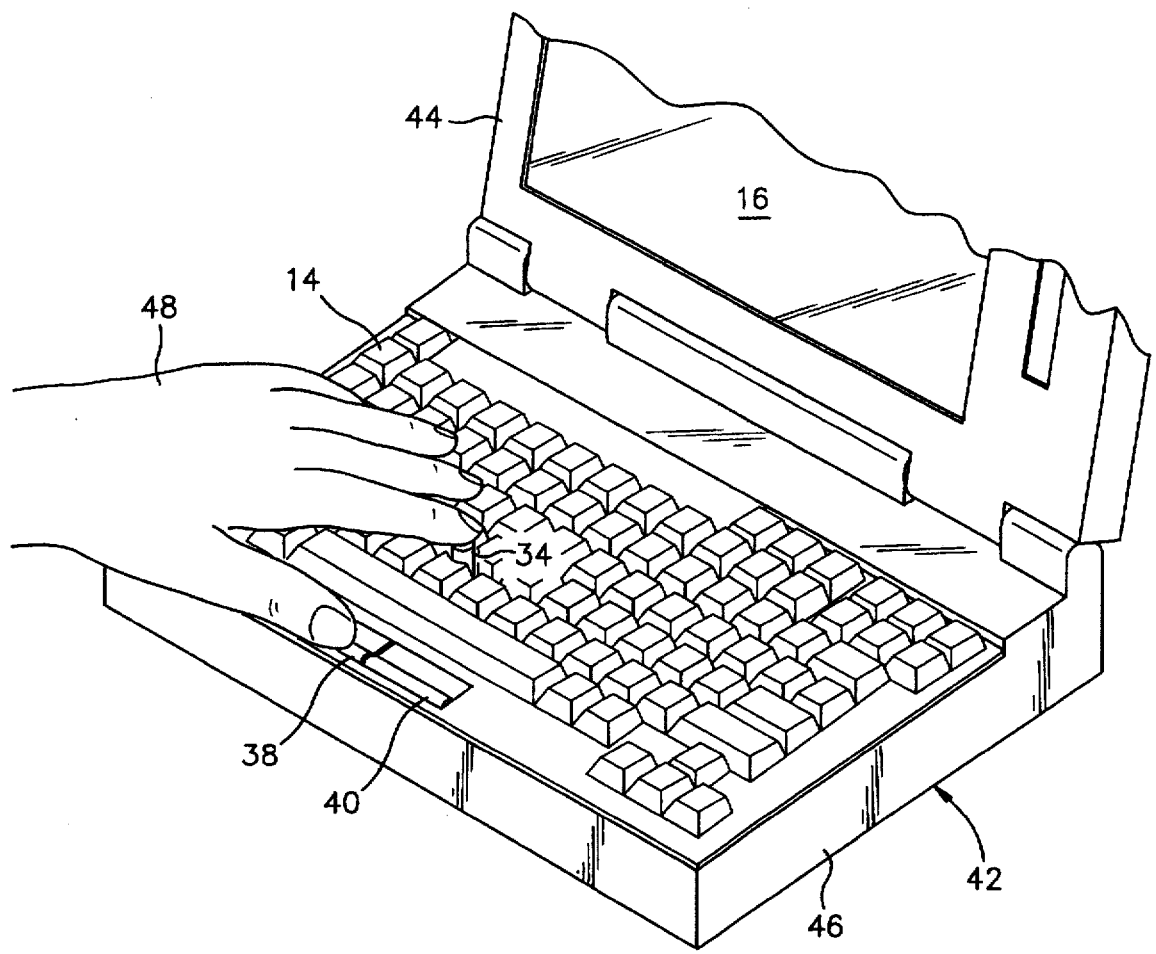
FIG. 3 is a perspective view of a laptop computer having a keyboard with the integrated pointing device and click buttons with lock down in accordance with the present invention.
Figure 10:
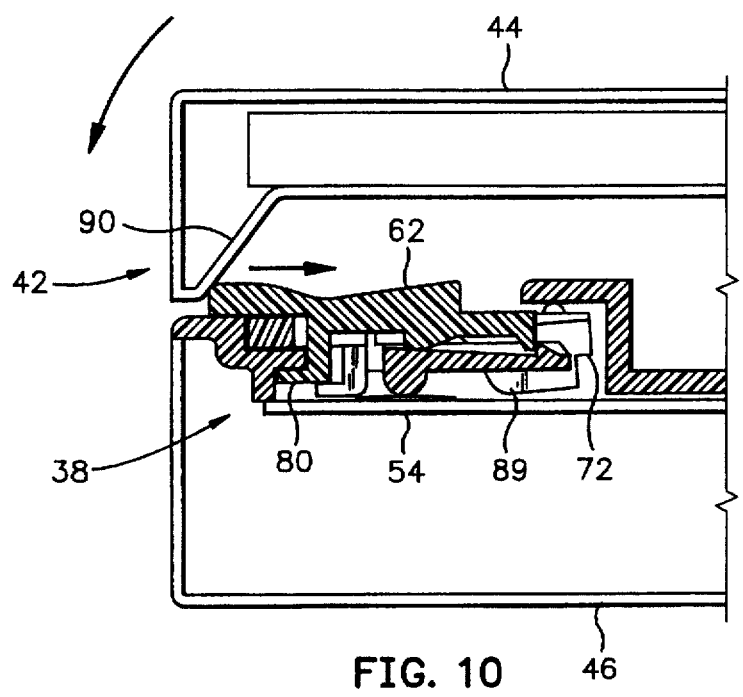
FIG. 10 is an enlarged vertical sectional view illustrating the lid of the laptop computer of FIG. 3 being closed down over one of the click button assemblies shown in its locked ON position which automatically releases the click button assembly.

FIG. 3 illustrates a laptop computer 42 equipped with the keyboard unit 14 and incorporating the display screen 16. The display screen 16 is carried on the inside of a lid 44 which is hingedly attached to the base 46 of the laptop computer. The lid 44 can be closed to conceal the keyboard unit 14 as shown in FIG. 10. In FIG. 3, the index finger and thumb of a user's left hand 48 are shown in engagement with the joystick actuator 34 and click button assembly 38, respectively.

Figure 4:
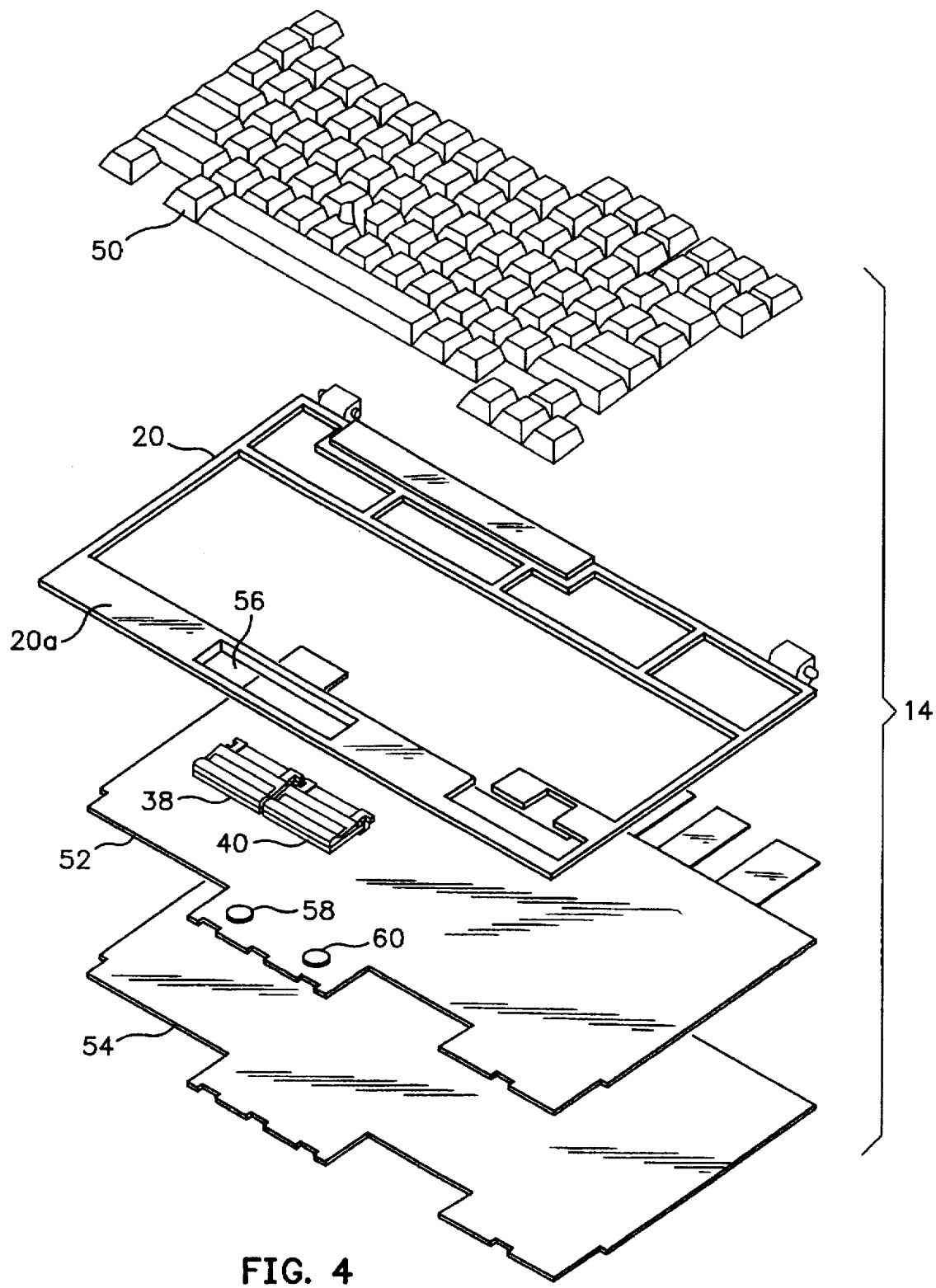
FIG. 4 is an exploded perspective view of the keyboard unit of the laptop computer of FIG. 3.

FIG. 4 is an exploded perspective view of the keyboard unit 14. It comprises a key button array 50, a flexible laminated switch array 52 and rigid metal base plate 54 which are held together, and supported by, the surrounding plastic rectangular frame 20. The click button assemblies 38 and 40 are mounted in side-by-side relationship inside a rectangular cutout region 56 in the rear planar wrist support 20a of the frame 20. The click button assemblies 38 and 40 may be individually depressed to close normally open momentary switches 58 and 60, respectively, connected to the switch array 52. The momentary switches 58 and 60 incorporate resilient flexible click domes which also function as restoring springs for the click button assemblies 38 and 40.

Figure 5A:
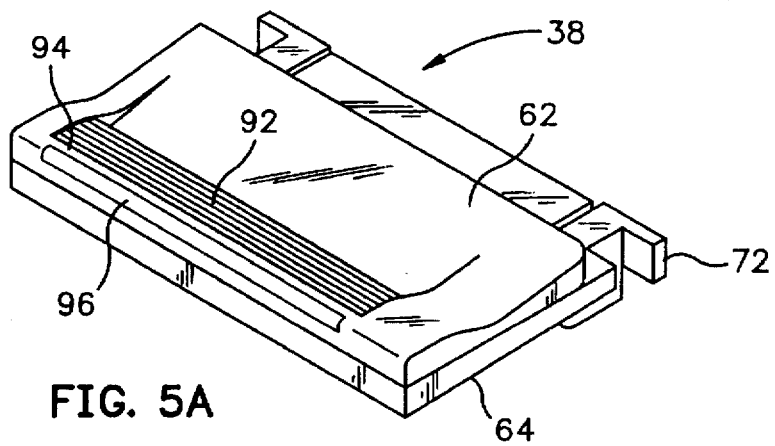
FIG. 5A is an enlarged perspective view of the upper side one of the click button assemblies.
Figure 5B:
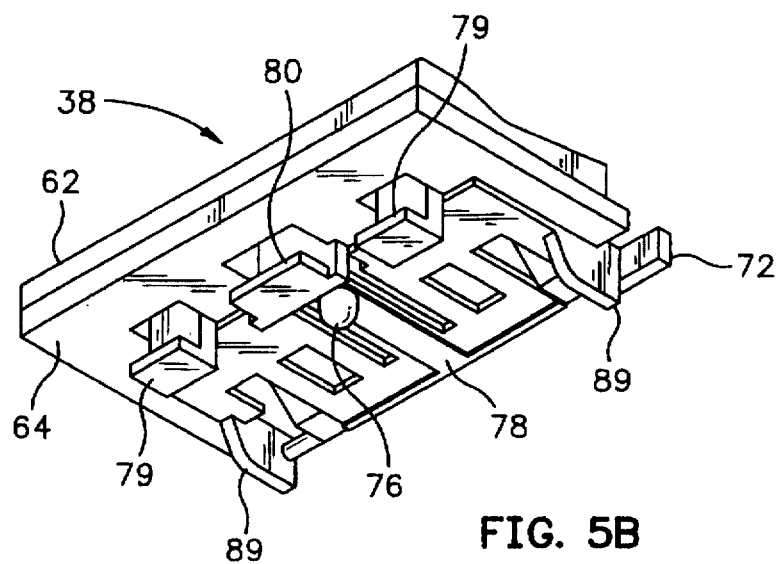
FIG. 5B is an enlarged perspective view of the underside of one of the click button assemblies.
Figure 6A:
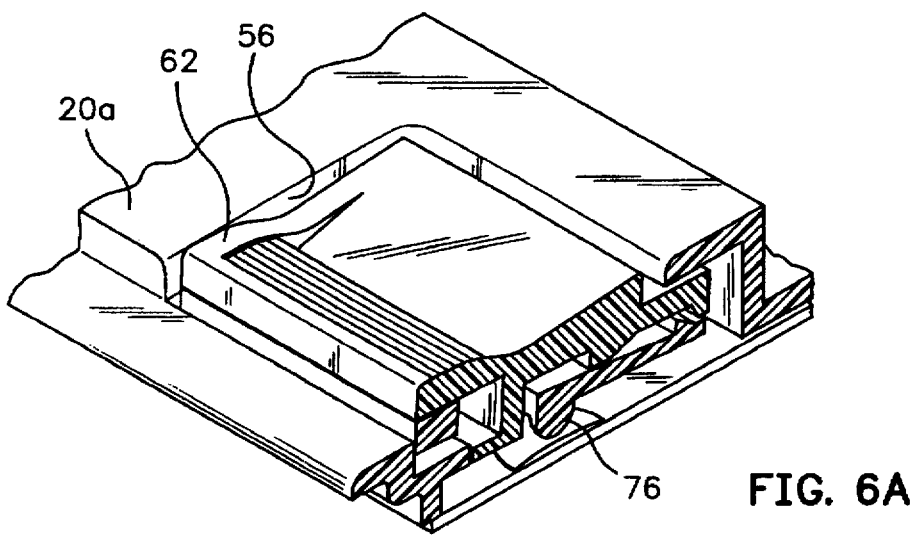
FIGS. 6A and 6B are enlarged fragmentary perspective views illustrating the OFF and ON positions, respectively, of one of the click button assemblies when mounted in the keyboard unit.
Figure 6B:
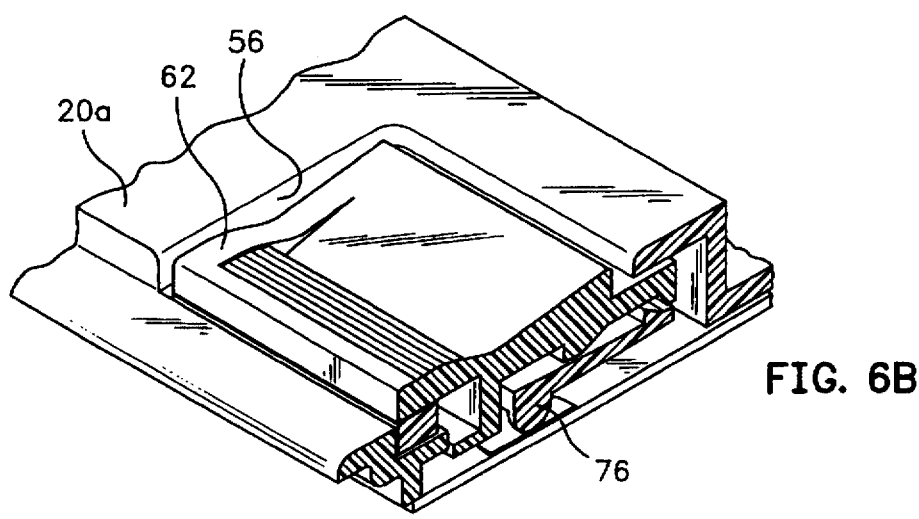
Figure 9:
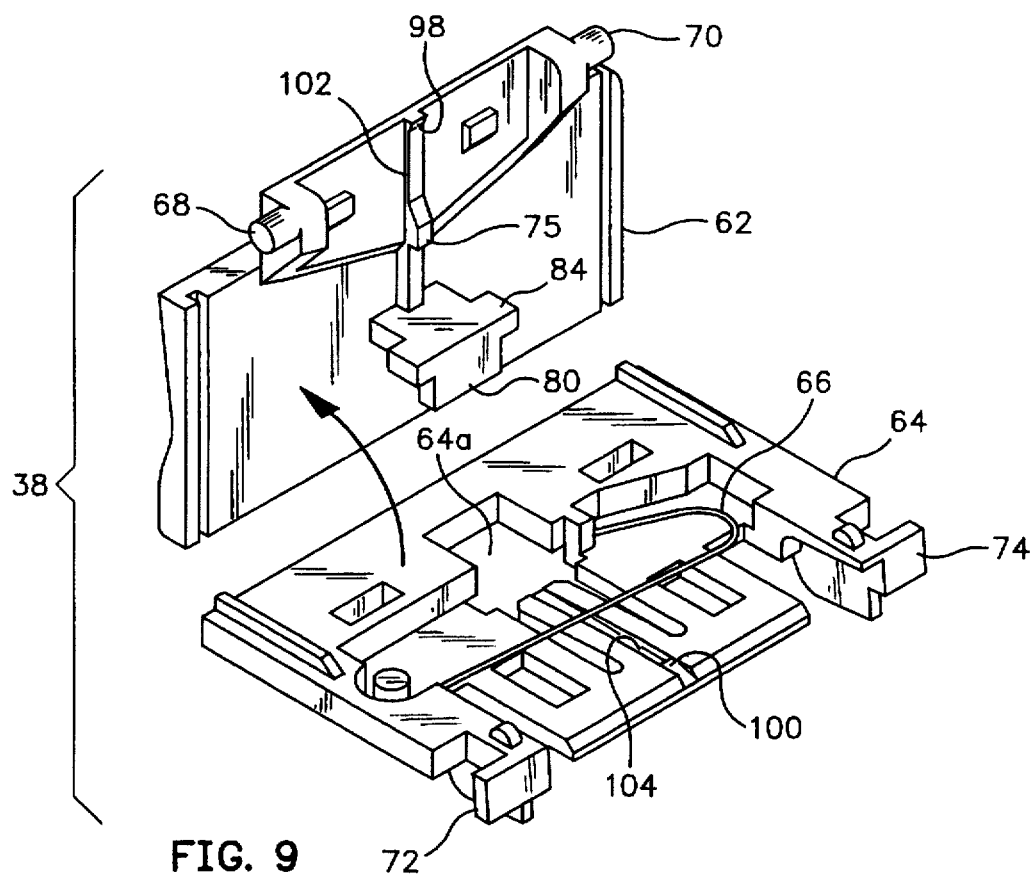
FIG. 9 is an exploded perspective view showing the internal construction of one of the click button assemblies.

The construction and operation of the click button assemblies is identical, so only that of click button 38 will be described. Referring to FIGS. 5A, 5B and 9, the click button assembly 38 has an overall planar, rectangular configuration and consists of three main components. These are a button 62, an actuator 64 and a spring 66. The button 62 and actuator 64 are injection molded plastic parts which join together in overlapping fashion and are capable of sliding back and forth relative to one another. The spring 66 has an overall J-configuration and is captured within a transversely extending aperture 64a (FIG. 9) of the actuator 64. The forward or leading edge of the button 62 is formed with a pair of horizontally extending guide pins 68 and 70 (FIG. 9). The forward or leading edge of the actuator 64 is formed with a pair of latch arms 72 and 74. The guide pins 68 and 70 slide within L-shaped tracks on the insides of the latch arms 72 and 74. Tab 75 on the button 62 engages and deflects spring 66 when the button 62 is slid rearwardly over the actuator 64. The actuator 64 is formed with a rounded pivot 76 (FIG. 5B) on the underside of an arm 78. As seen in FIG. 9, the spring 66 extends transversely across the top of the arm 78.

Figure 7:
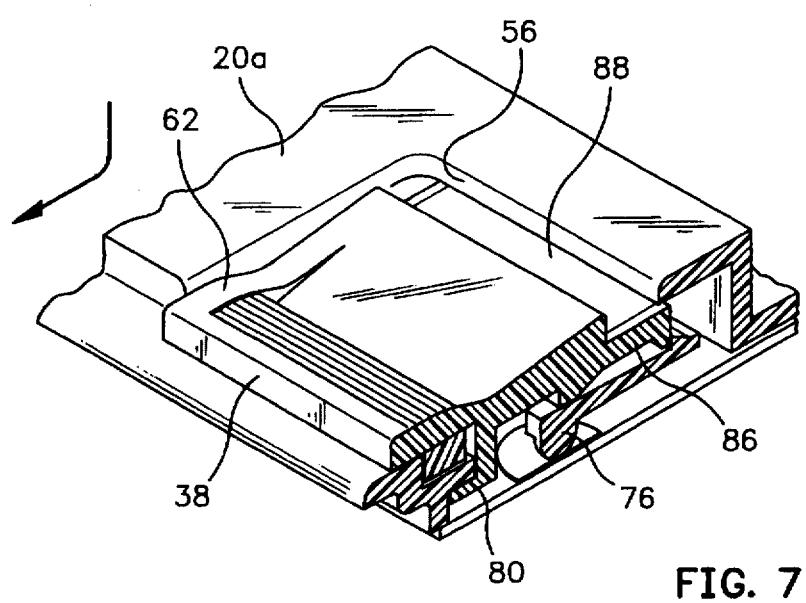
FIG. 7 is a view similar to that of FIGS. 6A and 6B illustrating the locked ON or drag position of the click button assembly.

The wrist support 20a of the keyboard unit 14 has walls formed around the cut-out region 56 for supporting the click button assemblies 38 and 40 and permitting downward pivoting, and rearward sliding thereof as hereinafter described. Manually depressing the button 62 causes the pivot 76 attached to the underside of the arm 78 to press down against the click dome 58 (FIG. 4) to make an electrical contact inside the underlying momentary switch turning it ON. L-shaped struts 79 (FIG. 5B) which extend from the underside of the actuator 64 limit downward travel of the click button assembly 38. Referring to FIG. 7, sliding the button 62 rearwardly with the user's thumb, while pushing down on the button 62 moves a horizontal rib 80 (FIGS. 7 and 9) beneath a flange 82 (FIG. 8B) of the frame 20, holding the entire click button assembly 38 depressed in its locked ON state. The rib 80 is connected to a vertical wall 84 (FIG. 9) which extends from the underside of the button 62 through the aperture 64a of the actuator 64. At the same time, a horizontal second rib 86 (FIG. 7) which extends in a forward direction from the button 62 slides rearwardly from underneath the wrist support 20a to reveal a brightly colored upper surface 88.

The user is provided with a tactile indication of the locked ON state by reason of the downwardly angled orientation of the click button assembly 38 and by the first rib 80 coming to a stop against the rear vertical wall 20b (FIG. 8B) of the frame 20. The user is also provided with a visual indication of the locked ON state of the click button assembly 38 by reason of the gap created between the leading or forward edge of the button 62 and the forward edge of the cut-out or recess 56. The user is further provided with a visual indication of the locked ON state of the click button assembly 38 by the exposure of the colored surface 88.

Figure 8A:
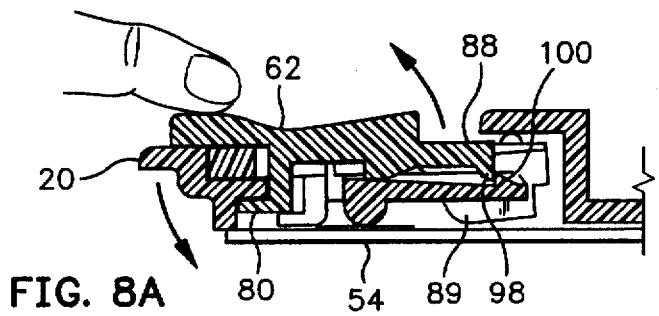
FIGS. 8A and 8B are enlarged vertical sectional views of one of the click button assemblies illustrating its locked (ON) and released (OFF) positions, respectively.

Pushing down on the top of the click button assembly 38 causes it to rotate slightly around the axis defined by the latch arms 72 and 74. This rotation is facilitated by rounded vertical support arms 89 (FIGS. 5B and 10) that extend downwardly from the actuator 64 and define part of the L-shaped tracks for slidably receiving the latch arms 72 and 74. While the click button assembly 38 is locked in its drag position illustrated in FIGS. 7 and 8A, the user can manipulate the joystick actuator 34 (FIG. 3) to drag an icon, window, or other feature across the display 16. For example, in FIG. 2 the user can drag the window W4 from its first location on the display shown in solid lines to a second location W4' shown in phantom lines to uncover the window W3. When the click button assembly 38 is released by sliding forwardly on button 62, it is urged forwardly by force of the spring 66 and lifts upwardly as a result of the restoring force of the underlying click dome 58.

If the user leaves the click button assembly 38 in its locked ON or drag state, and then closes the lid 44 (FIG. 10) of the laptop computer 42, a tapered inside edge 90 of the lid will engage the rearward edge of the button 62. This causes the button 62 to slide forwardly under the force of the spring 66 as indicated by the arrow. The click button assembly 38 is thus released automatically.

The upper side of the button 62 is formed with a recess 92 (FIG. 5A) which will receive the thumb of the user's hand 48. In addition, the button 62 is formed with a knurled transversely extending shoulder 94 along the rearward edge of the button. This increases the friction between the thumb of the user's hand and the button 62. Both the recess 92 and the shoulder 94 make it easier for the user to slide the button 62 rearwardly to lock the click button assembly 38 in its ON or drag mode. An additional brightly colored stripe 96 may be applied to the shoulder 94 to highlight the location of the click button assembly 38 to the user.

Figure 8B:
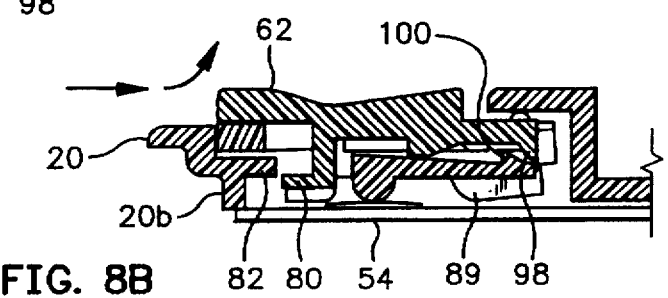

When the button 62 is slid rearwardly over the actuator 64, a small protrusion 98 (FIG. 8A) on the underside of the button 62 travels over an inverted V-shaped bump 100 on the upper side of the actuator 64. As shown in FIG. 9, the protrusion 98 is formed on the forward end of a longitudinally extending element 102 from which the tab 75 also extends. The protrusion 98 slides in a longitudinally extending groove 104 formed in the upper side of the actuator 64. When the button 62 is slid rearwardly over the actuator 64, the protrusion 98 rides over the bump 100 to the position shown in FIG. 8A. This latches and holds the button in its locked ON state against the force of the deflected spring 66. When the button 62 is thereafter urged forwardly by the user's thumb, the protrusion 98 rides up over the bump 100 and comes to rest in front of the bump as shown in FIG. 8B. Thus, our invention provides a useful lock down mechanism for click button assemblies associated with a pointing device integrated into a conventional computer keyboard. This not only saves time otherwise involved in reaching from the keyboard to operate a conventional mouse, but also facilitates the use of laptop and notebook computers having a GUI in cramped quarters such as airplane cabins. The click button assemblies of our invention operate in the conventional fashion as far a single click operation is concerned. That is, the user presses down either of the click button assemblies momentarily to select an icon or other feature on the display. If the top sliding button of the click button assembly is pulled toward the user while being pressed down, the locking mechanism will hold the click button assembly in its ON state mechanically, as well as electrically. This greatly facilitates a drag operation. The locked ON or drag mode of the click button assembly can be easily identified by the user both by look and feel, the drag mode being visually accentuated by a brightly colored element on a forward flange that is revealed. When the user pushes the click button assembly forwardly, the locking mechanism is released. The click dome helps pivot the click button assembly upwardly and the spring inside the click button assembly urges the top button forwardly. Also, the design of the click button assembly and its lock mechanism enables the lid of the portable computer to automatically release the click button assembly from its locked ON or drag mode when the lid is closed.

We have also provided a method of performing a drag operation in a computer system having a graphical user interface. From the foregoing description, it can be seen that our method comprises the initial step of connecting a specially adapted keyboard unit to the computer system. The keyboard unit has a plurality of keys, a pointing actuator mounted between preselected ones of the keys and at least one lockable click button assembly mounted to the keyboard unit adjacent the keys. The second step of our method comprises generating an image of an object to be dragged, such as an icon, a window or text. The image is generated at a first location on the display device of the computer system. The third step of our method comprises generating an image of a pointer on the display device. The fourth step of our method comprises the step of engaging the pointer actuator with the index finger of the user's hand and applying manual forces to move the pointer onto the object displayed at the first location. The fifth step of our method comprises locking the click button assembly with the thumb of the user's hand to select the object. The sixth step of our method comprises applying additional manual forces to the pointer actuator with the user's index finger to move the selected object to a second location on the display device.

While we have described a preferred embodiment of our keyboard with an integrated pointing device and click buttons with lock down for drag operation, and a method of dragging an object in a computer system having a graphical user interface, it should be apparent to those skilled in the art that our invention can be modified in both arrangement and detail. For example, the illustrated structure could be modified so that the button 62 could slide forwardly, rearwardly or sideways in conjunction with downward movement to achieve the locked ON state drag mode. Such movement forward, rearward or sideways of the button shall be collectively referred to as "lateral" movement. A pop-up pin could be used to indicate a sideways hook function. Therefore, the protection afforded our invention should only be limited in accordance with the scope of the following claims.

We claim:

1. An integrated manual control input device for use in a computer system having a graphical user interface, comprising:

a keyboard unit having a plurality of keys and a space bar;

a pointing actuator mounted to the keyboard unit between preselected ones of the keys for engagement by a user's index finger;

at least one click button assembly mounted to the keyboard unit in a location rearward of the space bar and having a button movable downwardly by a user's thumb to select an ON state and subsequently releasable to select an OFF state, and moveable downwardly and generally laterally to select a locked ON state to facilitate a drag operation; and a switch mounted to the keyboard unit and actuated by engagement of the button when the button is moved downwardly.

2. An integrated manual control input device according to claim 1 wherein the pointing actuator comprises a joystick.

3. An integrated manual control input device according to claim 1 wherein the click button assembly is located in a rearward location relative to the keys.

4. An integrated manual control input device according to claim 1 wherein there are a pair of click button assemblies mounted to the keyboard unit in side-by-side relationship rearward of a space bar of the keyboard unit.

5. An integrated manual control input device according to claim 1 wherein the click button assembly further includes means for pivotally mounting a forward edge of the click button assembly to a frame of the keyboard unit.

6. An integrated manual control input device according to claim 5 wherein the click button assembly includes a lower actuator over which the button is slidably rearwardly to engage a rib extending from the button with the frame to hold the click button assembly in its locked ON state.

7. An integrated manual control input device according to claim 6 and further comprising a second fib extending in a forward direction from the button and slidable rearwardly with the button from underneath the frame to reveal a colored surface that indicates the locked ON state to the user.

8. An integrated manual control input device according to claim 1 wherein the button has a depression formed in an upper side thereof to receive the user's thumb.

9. An integrated manual control input device according to claim 1 wherein the button is formed with a knurled bar on an upper side thereof adjacent a rear edge of the button to provide increased friction with the user's thumb.

10. An integrated manual control input device according to claim 6 wherein the click button assembly further includes a spring for urging the button forwardly.

11. An integrated manual control input device for use in a computer system having a graphical user interface, comprising:

a keyboard unit having a plurality of keys and a surrounding frame;

at least one click button assembly pivotally mounted in a cut-out region in the frame including an actuator and a button selectably slidable in a lateral direction over the actuator to engage the frame and lock the click button assembly in a depressed locked ON state; and a switch mounted to the frame beneath the actuator for transition between ON and OFF states when engaged by the actuator.

12. An integrated manual control input device according to claim 11 and further comprising a pointing actuator mounted to the keyboard unit between preselected ones of the keys for engagement by a user's index finger.

13. An integrated manual control input device according to claim 12 wherein the pointing actuator comprises a joystick.

14. An integrated manual control input device according to claim 11 wherein there are a pair of click button assemblies mounted to the keyboard unit in side-by-side relationship rearward of a space bar of the keyboard unit.

15. An integrated manual control input device according to claim 11 wherein the click button assembly further includes means for pivotally mounting a forward edge of the click button assembly to the frame of the keyboard unit.

16. An integrated manual control input device according to claim 11 wherein the button includes a rib which extends from the button to engage the frame to hold the click button assembly in its locked ON state.

17. An integrated manual control input device according to claim 16 and further comprising a second rib extending in a forward direction from the button and slidable rearwardly with the button from underneath the frame to reveal a colored surface that indicates the locked ON state to the user.

18. An integrated manual control input device according to claim 11 wherein the button is formed with a hurled bar on an upper side thereof adjacent a rear edge of the button to provide increased friction with the user's thumb.

19. An integrated manual control input device according to claim 11 wherein the click button assembly further includes a spring mounted for urging the button forwardly relative to the actuator.

20. A method of performing a drag operation in a computer system having a graphical user interface, comprising the steps of:

connecting a keyboard unit to the computer system, the keyboard unit having a plurality of keys, a pointing actuator mounted between preselected ones of the keys and at least lockable click button assembly mounted a adjacent to a reward edge of the keysboard unit;

generating an image of an object to be dragged, the object being selected from the group consisting of an icon, a window and text, the image being generated at a first location on a display device of the computer system;

generating an image of a pointer on the display device;

engaging the pointer actuator with the index finger of a user's hand and applying first manual forces to move the pointer onto the object displayed at the first location;

locking the click button assembly with the thumb of the user's hand to select the object; and applying second manual forces to the pointer actuator with the user's index finger to move the selected object to a second location on the display device.

* * * * *

UNITED STATES PATENT AND TRADEMARK OFFICE
CERTIFICATE OF CORRECTION

PATENT NO. : 5,694,123
DATED : December 2, 1997
INVENTOR(S) : Selker et al

It is certified that error appears in the above-indentified patent and that said Letters Patent is hereby corrected as shown below:

Column 7, line 52, change "fib" to --rib--.

Column 8, line 36, change "hurled" to --knurled--.

Column 8, line 49, after "least" insert --one--.

Column 8, line 49, delete "a".

Signed and Sealed this

Seventeenth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,694,123
DATED : December 2, 1997
INVENTOR(S) : Selker et al

It is certified that error appears in the above-indentified patent and that said Letters Patent is hereby corrected as shown below:

Col. 7, line 26, change "movable" to --moveable--.

Col. 8, line 50, change "reward" to --rearward--.

Col. 8, line 50, change "keysboard" to --keyboard--.

Signed and Sealed this

Fifteenth Day of September, 1998

Attest:

BRUCE LEHMAN

*Attesting Officer*     *Commissioner of Patents and Trademarks*